July 17, 1928.
J. W. PICKERING
PLASTERER'S FLOAT
Filed March 15, 1926
1,677,366
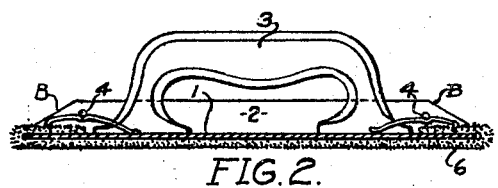
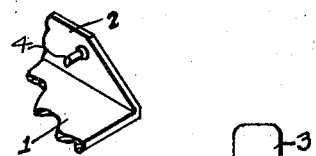
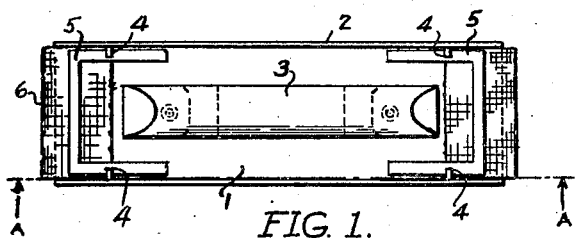
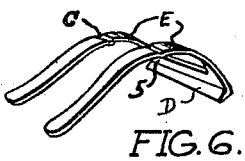
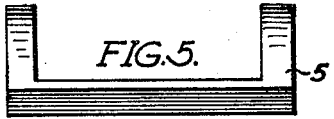
INVENTOR.
Joseph W. Pickering.
BY
U. G. Charles ATTORNEYS.

Patented July 17, 1928.

1,677,366

UNITED STATES PATENT OFFICE.

JOSEPH W. PICKERING, OF TOPEKA, KANSAS.

PLASTERER'S FLOAT.

Application filed March 15, 1926. Serial No. 94,834.

My invention relates to a plasterer's implement hereinafter termed as a float.

The object of my invention is to provide a float having sides formed by bending a portion of the plane of the float to a right angle for convenient means for properly forming the angles.

A further object of my invention is to provide a float that acute angles may be worked, or inconvenient conditions may be worked around.

A still further object of my invention is to provide a float having attaching means for a fabricated body placed thereon.

A still further object of my invention is to provide a float having attachments functioning as a carpet float.

A still further object of my invention is that the attaching means is removable, unincumbering the tool when being used ordinarily as a float.

A still further object of my invention is to construct a float eliminating superfluous materials, minimizing the weight and cost of the device.

These and other objects will hereinafter be more fully explained.

Referring to the drawings:

Fig. 1 is a top view of the float.

Fig. 2 is a longitudinal sectional view taken on line AA in Fig. 1 looking in the direction of the arrow.

Fig. 3 is an end view of the float shown in Figures 1 and 2.

Fig. 4 is an enlarged side view of the spring attaching means for the carpet.

Fig. 5 is an end view of Fig. 4.

Fig. 6 is a perspective view of Figures 4 and 5.

Fig. 7 is an enlarged fragmentary view of one of the corners of the float showing the position of the pin under which a wing of the spring attaching means engages.

In Figures 1 and 2, 1 is the base of the float having laterally extending sides 2, integral with the base forming a channel. The ends are bevelled as at B, the object of which is to allow the end of the float to enter a sharp inside angle. Concentrically positioned on the base is a handle 3 attached to the base firmly. Positioned in the sides near the ends are pins 4 under which will engage the spring members of the attaching means 5; the said springs having curvatures as at C functioning as detents when tensioned to engagement with the pins 4. The spring attaching means consists of a blade D having a laterally extending spring E on each end thereof and integral therewith. The opposite ends of the springs having a short bend as at F as sliding means for the ends of the springs when being placed to engagement binding the ends of a strip of carpet 6 functioning as a float for sand finish.

The carpet is placed on the plane of the base with both ends lapping back over the end thereof as shown in Figures 1 and 2, then the spring attaching means is entered at the end of the float allowing the springs to slide under the pins until the detents have been reached, at which time the carpet will be tensioned snugly on the end of the blade. It will be understood that the sliding movement is a stretching means for the carpet as the base is inclined to be imbedded therein, carrying it therewith as the detents are forced to engagement.

When the float is to be used for smooth work such as putty coating or the like, the carpet is removed, and can be used the same as an ordinary float taking the mortar from the hawk.

The floats herein described are preferably made of aluminum, but I do not confine the structure to be made of such materials as other metals may be employed, and such other modifications may occur as lie within the scope of the appended claim.

Having thus described my invention, what I claim as new and desire to secure by Letters Patent is:—

In a float, a base having laterally extending sides, pins laterally extending inward and positioned near both ends of the laterally extending sides, blades having sharp edges and laterally positioned springs adjacent the ends thereof, a curvature centrally positioned on the springs in which the pins will seat, and a curvature on the outwardly extending ends of the springs as free sliding means therefor on the base, the said member adapted to engage with the said pins at the ends of the float as tensioning and holding means for a carpet stretched on the plane of the base.

JOSEPH W. PICKERING.